(12) United States Patent
Vergelati et al.

(10) Patent No.: US 8,168,088 B2
(45) Date of Patent: May 1, 2012

(54) ELECTRICALLY CONDUCTIVE COMPOSITIONS/SHAPED ARTICLES COMPRISING POLYAMIDE MATRICES

(75) Inventors: Caroll Vergelati, Saint Baudille de la Tour (FR); Nicolangelo Peduto, Milan (IT)

(73) Assignee: Rhodia Operations, Aubervilliers (FR)

( * ) Notice: Subject to any disclaimer, the term of this patent is extended or adjusted under 35 U.S.C. 154(b) by 489 days.

(21) Appl. No.: 12/295,896

(22) PCT Filed: Apr. 3, 2007

(86) PCT No.: PCT/EP2007/053247
§ 371 (c)(1),
(2), (4) Date: Apr. 1, 2009

(87) PCT Pub. No.: WO2007/113302
PCT Pub. Date: Oct. 11, 2007

(65) Prior Publication Data
US 2010/0072431 A1 Mar. 25, 2010

(30) Foreign Application Priority Data
Apr. 4, 2006 (FR) ...................................... 06 02923

(51) Int. Cl.
*H01B 1/02* (2006.01)
*H01B 1/06* (2006.01)
*C08F 8/00* (2006.01)
*C08G 18/42* (2006.01)

(52) U.S. Cl. ......... 252/511; 252/512; 524/500; 525/143

(58) Field of Classification Search ....... 252/500–521.6, 252/511, 512; 524/500; 525/143
See application file for complete search history.

(56) References Cited

U.S. PATENT DOCUMENTS

| 4,845,162 | A | * | 7/1989 | Schmitt et al. ................. 525/423 |
| 5,639,819 | A | * | 6/1997 | Farkas et al. ................... 524/606 |
| 5,670,576 | A | * | 9/1997 | Takatani et al. ............... 525/132 |
| 5,872,187 | A | * | 2/1999 | Takatani et al. ............... 525/133 |
| 6,352,654 | B1 | | 3/2002 | Silvi et al. |
| 7,022,265 | B2 | * | 4/2006 | Cheng et al. ................... 252/506 |
| 2004/0063857 | A1 | * | 4/2004 | Vathauer et al. ................ 525/63 |
| 2006/0124906 | A1 | | 6/2006 | Bradley et al. |

FOREIGN PATENT DOCUMENTS

| DE | 4300259 A1 | 7/1994 |
| DE | 19742867 C1 | 12/1998 |
| FR | 2847902 A1 | 6/2004 |
| WO | WO 2004/014994 A2 | 2/2004 |

* cited by examiner

*Primary Examiner* — Mark Kopec
*Assistant Examiner* — Jaison Thomas
(74) *Attorney, Agent, or Firm* — SNR Denton US LLP

(57) ABSTRACT

Polyamide matrix-based compositions containing electrically conductive fillers are molded into plastic shaped articles, e.g., automotive body parts, which are improvedly painted by electrostatic deposition processing.

19 Claims, No Drawings

ELECTRICALLY CONDUCTIVE COMPOSITIONS/SHAPED ARTICLES COMPRISING POLYAMIDE MATRICES

CROSS-REFERENCE TO PRIORITY/PCT APPLICATIONS

This application claims priority under 35 U.S.C.§119 of FR 0602923, filed Apr. 4, 2006, and is a continuation/national phase of PCT/EP 2007/053247, filed Apr. 3, 2007 and designating the United States (published in the French language on Oct. 11, 2007, as WO 2007/113302 A1; the title and abstract were also published in English), each hereby expressly incorporated by reference in its entirety and each assigned to the assignee hereof.

The present invention relates to a composition based on a polyamide matrix comprising electrically conductive filters. The shaping of this composition makes it possible to obtain plastic articles, such as, for example, bodywork parts in the field of the automobile industry, having a good ability to be painted by a process of electrostatic deposition of the paint.

There exists a high demand in numerous industries for components made of polyamide-based plastics; which have the advantage of being light and of being able to be devised and designed more easily than parts made of steel or aluminum, in particular in the field of the automobile industry.

However, plastic parts present problems when it is desired to paint them.

Thus, for example, in the field of the automobile industry, there exists in particular three main methods of painting by an electrostatic process, that is to say by movement of the particles under the influence of an electric current. The first, referred to as "inline process", refers to a process according to which the plastic part is assembled on the vehicle after the latter has been subjected to the degreasing and electroplating stages, followed by a drying stage. The plastic part and the vehicle are subsequently painted and dried by heating. The second, known as "online" process, refers to a process according to which the plastic part is assembled on the vehicle at the beginning of the abovementioned process. The plastic parts thus undergo the degreasing, electroplating and drying stages. Consequently, for this type of process, it is necessary for the plastic parts to be able to withstand higher temperatures, of the order of 180° C.

In a third process, known as "offline" process, the plastic part is first painted in order to be subsequently assembled on the vehicle.

When use is made of electrostatic deposition painting processes, it is found that the ability to paint conventional plastic parts is poor. This is because the paint is readily lifted and does not adhere or does not adhere very well to the plastic parts.

There thus exists a need to formulate polyamide compositions exhibiting a good ability to be painted by a process for the electrostatic deposition of the paint and good mechanical properties.

The Applicant Company has demonstrated a composition based on a polyamide matrix comprising in particular novolak resin and a dispersed phase based on a polymeric matrix which is immiscible with the polyamide; said disperse phase comprising electrically conductive fillers.

This composition makes possible the shaping of articles exhibiting good conductivity and consequently a good ability for application of the paint by electrostatic deposition, and also good mechanical properties. The articles obtained also exhibit good dimensional stability, a good surface appearance and a good propensity for molding. The painted articles also exhibit good adhesion of the paint and good resistance to moisture.

These plastic parts are thus very well suited to the painting processes, in particular painting by an "inline", "online" and "offline" electrostatic process, used in the automobile industry.

A first subject matter of the present invention is a composition comprising at least:

a continuous phase (1) of polyamide comprising at least one novolak resin and electrically conductive fillers (B); and a disperse phase (2) of a polymer (A) which is immiscible with the polyamide, in the continuous phase of polyamide (1), this disperse phase comprising at least electrically conductive fillers (C).

The polyamide composition can comprise in particular one or more types of electrically conductive fillers (B) and (C) and one or more types of polymers (A) which are immiscible with the polyamide.

Mention may be made, as type of polyamide, for example, of semicrystalline or amorphous polyamides, such as aliphatic polyamides, semiaromatic polyamides and more generally polyamides obtained by polycondensation between an aliphatic or aromatic saturated diacid and an aromatic or aliphatic saturated primary diamine, polyamides obtained by condensation of a lactam or of an amino acid, or polyamides obtained by condensation of a mixture of these various monomers. These copolyamides can, for example, be poly(hexamethylene adipamide), polyphthalamides obtained from terephthalic and/or isophthalic acid, or copolyamides obtained from caprolactam and from one or more monomers generally used in the manufacture of polyamides, such as adipic acid, terephthalic acid and/or hexamethylenediamine.

Mention may in particular be made of (co)polyamides 6, 6.6, 4.6, 6.10, 6.12, 11, 12, 6.18, 6.36, 6(T), 9(T), 6(I), MXD6 and/or blends, such as polyamides 6/6.6, 6/6.18 and 6/6.36, for example.

The polyamide matrix can in particular be a polymer comprising star or H macromolecular chains and, if appropriate, linear macromolecular chains. Polymers comprising such star or H macromolecular chains are described, for example, in the documents FR 2 743 077, FR 2 779 730, U.S. Pat. No. 5,959,069, EP 0 632 703, EP 0 682 057 and EP 0 832 149.

According to another specific alternative form of the invention, the polyamide matrix, of the invention can be a polymer of random tree type, preferably a copolyamide exhibiting a random tree structure. These copolyamides with a random tree structure and their process of preparation are described in particular in the document WO 99/03909. The matrix of the invention can also be a composition comprising a linear thermoplastic polymer and a star, H and/or tree thermoplastic polymer as described above. The matrix of the invention can also comprise a hyperbranched copolyamide of the type of those described in the document WO 00/68298. The composition of the invention can also comprise any combination of linear, star, H and tree thermoplastic polymer and hyperbranched copolyamide as described above.

The composition according to the invention can comprise between 20 and 80% by weight, preferably between 30 and 60% by weight, of polyamide, with respect to the total weight of the composition.

The composition thus comprises a disperse phase (2) of a polymer (A) which is immiscible with the polyamide, in a continuous phase of polyamide (1). This polymer (A) is preferably compatible and immiscible with the polyamide.

Numerous polymers (A) of this type exist. Mention may be made, without implied limitation, for example, of polymers chosen from the group consisting of: polyethylene (PE), polypropylene (PP), ethylene/propylene (EP), ethylene/propylene/diene (EPDM) terpolymer, styrene/maleic anhydride (SMA), ultralow density polyethylene (ULDPE), linear low density polyethylene (LLDPE), styrene/ethylene/butadiene/WO styrene (SEBS), acrylic elastomers (such as polyacrylic elastomers), ionomeric elastomers, acrylonitrile/butadiene/styrene (ABS) terpolymer and acrylic/styrene/acrylonitrile (ASA) terpolymer, ethylene/ethyl acrylate (EEA), ethylene/vinyl acetate (EVA), polybutylene terephthalate (PBT), polyethylene terephthalate (PET), polyphenylene ether (PPE), polycarbonate (PC), polyoxymethylene (PON), polyvinyl chloride (PVC), polystyrene, polyetheramide, polyethylene sulfone and/or their blends.

The polymers (A) according to the invention can also be combinations, blends, homopolymers, copolymers or terpolymers of the compounds mentioned above.

These polymers (A) can optionally comprise grafted groups for compatibilizing with the polyamide, such as maleic anhydride or epoxy groups.

These polymers (A) are preferably elastomers, such as, for example, ethylene/propylene/diene terpolymer grafted with maleic anhydride, and ethylene/ethyl acrylate.

The composition according to the invention can comprise between 1 and 40% by weight, preferably between 5 and 20% by weight, of polymer (A) constituting the disperse phase (2) in the continuous phase (1) of polyamide, with respect to the total weight of the composition.

The composition thus comprises electrically conductive fillers (B) situated in the continuous phase (1) of polyamide and electrically conductive fillers (C) situated in the disperse phase (2) of a polymer (A) which is immiscible with the polyamide phase. These fillers (B) and (C) can be identical or different in the two phases (1) and (2).

The electrically conductive fillers (B) and (C) are preferably chosen from the group consisting of: conductive carbon black, a metal, an antistatic agent, graphite, glass and/or an inorganic filler coated with a layer of metal, and/or their mixture, preferably conductive carbon black.

Conductive carbon black is described in particular in Carbon Black, Second Edition, Revised and Expanded, Science and Technology, edited by J B. Donnet, R C Bansal and M J Wang, Marcel Dekker Inc., pages 271-275.

The glass and/or inorganic fillers can be coated with a layer of metal, such as nickel or titanium, for example.

The electrically conductive fillers can be in the form of spheres, such as, for example, in the form of microspheres and/or nanospheres; of tubes, such as, for example, in the form of microtubes and/or nanotubes; and/or of fibers, such as, for example, in the form of microfibers and/or nanofibers. These fibers can be chopped up and/or ground.

The antistatic agents can be chosen, for example, from polyetheramides, sodium alkylsulfonates, alkylbenzenesulfonates or ethoxylated amines.

The composition according to the invention can comprise between 0.5 and 50% by weight, preferably between 2 and 30% by weight, more preferably still between 5 and 20% by weight, of electrically conductive fillers (B) and (C), with respect to the total weight of the composition.

The continuous phase (1) of polyamide can comprise between 0.5 and 50% by weight, preferably between 1 and 20% by weight, of electrically conductive fillers (B), with respect to its total weight.

The disperse phase (2) of polymer (A) can comprise between 0.5 and 50% by weight, preferably between 1 and 20% by weight, of electrically conductive fillers (C), with respect to the total weight of the disperse phase (2) of polymer (A).

The presence of electrically conductive fillers (C) included in the disperse phase (2) of the polymer (A) of the composition can be disclosed and analyzed in different ways. It is possible in particular to dissolve the dispersed phase (2) by using a solvent selected for the polymer (A) which will not dissolve the polyamide matrix. On recovering the dissolved polymer (A), it will then be possible to detect the presence in the latter of electrically conductive fillers (C), for example by using a scanning microscope.

The composition according to the invention also comprises a novolak resin. Novolak resins are polyhydroxy compounds, for example condensation products of phenolic compounds with aldehydes. These condensation reactions are generally catalyzed by an acid.

The phenolic compounds can be chosen, alone or as a mixture, from phenol, cresol, xylenol, naphthol, alkylphenols, such as butylphenol, tert-butylphenol or isooctylphenol; or any other substituted phenol. The most frequently used aldehyde is formaldehyde. However, it is possible to use others of them, such as acetaldehyde, paraformaldehyde, butyraldehyde, crotonaldehyde and glyoxal.

The resins used advantageously have a high molecular weight of between 500 and 3000 g/mol, preferably between 800 and 2000 g/mol.

Mention may in particular be made, as commercial novolak resin, of the products Durex®, Vulkadur® or Rhenosin®.

The composition according to the invention can comprise between 1 and 20% by weight, preferably between 2 and 15% by weight, of a novolak resin, with respect to the total weight of the composition.

The composition of the invention can also comprise impact-modifying agents, such as elastomers. Use may be made of elastomers comprising groups for compatibilizing with the polyamide or blends of elastomers, some of which comprise groups for compatibilizing with the polyamide. To this end, use may be made, for example, of ethylene/propylene/diene (EPDM) terpolymer grafted with maleic anhydride, styrene/ethylene/butadiene/styrene (SEES) grafted with maleic anhydride, an ultralow density polyethylene (ULDPE) grafted with maleic anhydride, a modifier of Lotader type or an ionomer of Surlyn® type.

These impact-modifying agents are preferably of between 1 and 30% by weight, preferably between 5 and 20% by weight, with respect to the total weight of the composition.

The composition can also comprise reinforcing or bulking fillers, in particular inorganic fillers, in the fibrous or particulate form, such as, for example, glass fibers, metal fibers, carbon fibers, clays, kaolin, wollastonite, mica, talc and glass beads. The degree of incorporation of these fillers is in accordance with the standards in the field of composite materials. It can, for example, be a degree of filler of 1 to 70% by weight, preferably of 10 to 40% by weight, with respect to the total weight of the composition.

The composition of the invention can additionally comprise one or more additives normally used by a person skilled in the art in thermoplastic compositions, in particular used in the manufacture of molded articles. Thus, mention may be made, as example of additives, of heat stabilizers, flame retardants, molding agents, such as calcium stearate, UV stabilizers, antioxidants, lubricants, abrasion reducers, pigments, dyes, plasticizers, laser marking promoters, waxes or agents which modify the impact strength. By way of example, the antioxidants and heat stabilizers are, for example, alkaline halides, copper halides, sterically hindered phenolic compounds, organic phosphites and aromatic amines. The UV stabilizers are generally benzotriazoles, benzophenones or HALS in combination with antioxidants.

The present invention also relates to a process for the preparation of a composition according to the invention.

Generally, the production of a disperse phase (2) of a polymer (A) which is immiscible with the polyamide comprising the electrically conductive fillers (C), in the continuous phase (1) of polyamide, can be achieved by blending a polyamide composition with a composition based on polymer (A) comprising electrically conductive fillers (C). The other constituents of the final composition, such as the phenolic resin and the other electrically conductive fillers (B), can be added at any point, in particular before, during or after said blending mentioned above, in various ways. This blending can be carried out under molten conditions or alternatively under cold conditions with a mechanical mixer, followed by a melting stage.

This way of producing the composition according to the invention makes it possible in particular to confer on it a homogeneous and reproducible conductivity.

Mention may in particular be made of the following processes for the manufacture of the composition according to the invention:

Process 1: The final composition is obtained by blending a polyamide composition comprising electrically conductive fillers (B) and the novolak resin with a composition based on polymer (A) comprising electrically conductive fillers (C). This blending can be carried out under molten conditions or alternatively under cold conditions, followed by a melting stage.

Process 2: The final composition is obtained by blending a polyamide composition comprising novolak resin with a composition based on polymer (A) comprising electrically conductive fillers (C). Subsequently, the resulting composition is blended with a polyamide composition comprising electrically conductive fillers (B). These blendings can be carried out under molten conditions or alternatively under cold conditions, followed by a melting stage. It is preferable in particular to prepare the final composition by melt blending a polyamide composition comprising novolak resin with a composition based on polymer (A) comprising electrically conductive fillers (C); and subsequently cold blending the resulting composition with a polyamide composition comprising electrically conductive fillers (B).

The other constituents of the composition, such as the impact-modifying agents, the reinforcing or bulking fillers and the various additives, can be added at any point, in various ways.

Melt blending can be carried out, for example, in a single- or twin-screw extruder or via Buss technology. The various compounds can be produced simultaneously or successively. Any means known to a person skilled in the art relating to the introduction of the various compounds of a thermoplastic composition can be used. Use is generally made of an extrusion device in which the material is heated, subjected to a shear force and conveyed along. The composition according to the invention, when it is prepared using an extrusion device, can be conditioned in the form of granules. The parts are then subsequently produced by melting the granules produced above and feeding the molten composition to the appropriate shaping devices, such as molding, injection molding or extrusion devices. They can be molded articles, for example.

The final composition can in particular be obtained by using masterbatches based on polyamide comprising electrically conductive fillers (B); and masterbatches based on polymer (A) comprising electrically conductive fillers (C). These masterbatches can be produced by continuous or batchwise blending, according to methods well known to a person skilled in the art. Use may be made, in order to do this, for example of a mechanical mixer or an extruder.

The present invention also relates to the use of a composition as defined above in the manufacture of an article intended in particular to be painted by an electrostatic process for the deposition of paint. These articles can be produced in particular by molding, injection molding, extrusion or extrusion/blow molding. These articles are particularly appropriate for "inline" and "online" electrostatic painting processes used in the automobile industry.

The paint can be applied to the article, for example, by spraying or immersion. Generally, a process for the application of paint to an article by electrostatic deposition comprises at least the following stages: cataphoresis treatment of the article at temperatures in particular of between 150 and 220° C., optionally application of a primer by electrostatic spraying and, finally, application of the paint by electrostatic spraying. Each spraying stage can be followed by stage(s) of heating at temperatures of between 100 and 200° C., and by stage(s) of cooling.

The present invention also relates to an article painted by a process for the application of paint by electrostatic deposition.

These articles according to the invention can, for example, be automobile parts, in particular bodywork parts, pipes intended for the transportation of fluids or gases, tanks, filters, coatings, films and/or plastic lids of tanks.

Other details or advantages of the invention will become more clearly apparent in the light of examples given below purely by way of indication.

EXAMPLE 1

Preparation of the Compositions

Compounds used:
Polyamide 66 (Technyl® 27A00)
Masterbatch 1: EEA+23% by weight of conductive carbon black
Masterbatch 2: polyamide 66+22% by weight of conductive carbon black
Wollastonite M3 Wollastocoat® 10012 (Nyco)
Novolak resin (Rhenosin® PR95)
EPDM-MA (Fusabond® MF416D from DuPont)
Formulation additives: heat and light stabilizers In order to manufacture the composition, the polyamide, the novolak resin, the wollastonite, the EPDM-MA and the masterbatch 1 are blended by extrusion via a twin-screw extruder (barrel temperature: 250-290° C., throughput: 30 kg/h, rotation: 250 rpm). The resulting composition is subsequently mechanically blended with the masterbatch 2. The final composition is then extruded and granulated, and then injection molded.

The composition thus comprises 27.8% by weight of polyamide 66, 6.5% by weight of masterbatch 1, 35% by weight of masterbatch 2, 17.5% by weight of wollastonite, 5% by weight of novolak, 6.5% by weight of EPDM-MA and 1.7% by weight of formulation additives.

EXAMPLE 2

Measurement of the Properties

The compositions are shaped and their mechanical, shrinkage, water uptake, dimensional stability and resistivity properties are mentioned in table 1:

TABLE 1

|  | Composition |
| --- | --- |
| Notched Charpy at 23° C. (in kJ/m²/ISO 179/1eA) | 8.8 |
| Unnotched Charpy at 23° C. (in kJ/m²/ISO 179/1eU) | 108 |
| Notched Charpy at −30° C. (in kJ/m²/ISO 179/1eA) | 8 |
| Modulus (N/mm²/ISO 527) | 3160 |
| Elongation (%/ISO 527) | 7 |
| Parallel shrinkage (%/ISO 294-4) | 1.69 |
| Perpendicular shrinkage (%/ISO 294-4) | 1.44 |
| Water uptake at 40° C./95% RH | 1.47 |
| Dimensional variation (%) | 0.16 |
| Surface resistivity (in/IEC 61340-41) | $10^{10}$ |

Compared with a similar conventional polyamide composition not comprising conductive fillers in a dispersed elastomeric phase or novolak resin, the mechanical properties are observed to maintain, indeed even improve; in addition, a strong reduction in water uptake, the shrinkage and dimensional variation is observed. The conductivity obtained shows that the composition is perfectly suitable for being painted by an electrostatic deposition process.

EXAMPLE 3

Paint

Plastic parts based on the abovementioned composition are obtained by injection molding.

The articles thus obtained were tested for their abilities to be painted by an electrostatic process according to various test methods, in particular combined together in Normes Véhicules [Vehicle Standards] B15 5050 of PSA (Peugeot Citroën).

A very good ability of the plastic parts to be painted by an electrostatic deposition process, good adhesion of the paint, good resistance of the paint after crosshatching and good resistance to moisture of this paint are observed.

What is claimed is:

1. A polyamide matrix composition comprising:
   a continuous phase (1) of polyamide which comprises at least one novolak resin and electrically conductive fillers (B); and
   a dispersed phase (2) of a polymer (A) which is immiscible with the polyamide, in the continuous phase of polyamide (1), said disperse phase also comprising electrically conductive fillers (C), wherein the electrically conductive fillers (B) and (C) are present in an amount of 0.5% to 50% by weight, with respect to the total weight of the composition.

2. The polyamide matrix composition as defined by claim 1, said polyamide being selected from the group consisting of (co)polyamides 6, 6.6, 4.6, 6.10, 6.12, 11, 12, 6.18, 6.36, 6(T), 9(T), 6(I), MXD6 and/or blends thereof.

3. The polyamide matrix composition as defined by claim 1, comprising from 20% to 80% by weight of polyamide, with respect to the total weight thereof.

4. The polyamide matrix composition as defined by claim 1, wherein the polymer (A) is selected from the group consisting of polyethylene (PE), polypropylene (PP), ethylene/propylene (EP), ethylene/propylene/diene (EPDM) terpolymer, styrene/maleic anhydride (SMA), ultralow density polyethylene (ULDPE), linear low density polyethylene (LLDPE), styrene/ethylene/butadiene/styrene (SEBS), acrylic elastomers, polyacrylic elastomers, ionomeric elastomers, acrylonitrile/butadiene/styrene (ABS) terpolymer and acrylic/styrene/acrylonitrile (ASA) terpolymer, ethylene/ethyl acrylate (EEA), ethylene/vinyl acetate (EVA), polybutylene terephthalate (PBT), polyethylene terephthalate (PET), polyphenylene ether (PPE), polycarbonate (PC), polyoxymethylene (POM), polyvinyl chloride (PVC), polystyrene, polyetheramide, polyethylene sulfone and/or blends thereof.

5. The polyamide matrix composition as defined by claim 1, comprising from 1% to 40% by weight of polymer (A) constituting the dispersed phase (2) in the continuous phase (1) of polyamide, with respect to the total weight of the composition.

6. The polyamide matrix composition as defined by claim 1, wherein the electrically conductive fillers (B) and (C) are selected from the group consisting of conductive carbon black, a metal, an antistatic agent, graphite, glass and/or an inorganic filler coated with a layer of metal, and/or mixture thereof.

7. The polyamide matrix composition as defined by claim 1, comprising from 1% to 20% by weight of novolak resin, with respect to the total weight thereof.

8. The polyamide matrix composition as defined by claim 1, further comprising impact-modifying agents.

9. The polyamide matrix composition as defined by claim 1, comprising reinforcing or bulking fillers.

10. A process for the formulation of a polyamide matrix composition as defined by claim 1, comprising blending at least one polyamide composition with a composition based on polymer (A) which comprises electrically conductive fillers (C), other constituents thereof being added before, during or after said blending, wherein the other constituents are comprised of the at least one novolak resin and the electrically conductive fillers (B).

11. A process for the formulation of a polyamide matrix composition as defined by claim 1, comprising blending a polyamide composition which comprises electrically conductive fillers (B) and the novolak resin with a composition based on polymer (A) which comprises electrically conductive fillers (C), this blending being carried out under molten conditions or under cold conditions, followed by a melting thereof.

12. A process for the formulation of a polyamide matrix composition as defined by claim 1, comprising blending a polyamide composition which comprises novolak resin with a composition based on polymer (A) which comprises electrically conductive fillers (C), and subsequently blended the resulting composition with a polyamide composition which comprises electrically conductive fillers (B), these blendings being carried out under molten conditions or alternatively under cold conditions, followed by a melting thereof.

13. A molded shaped article comprising the polyamide matrix composition as defined by claim 1.

14. The molded shaped article as defined by claim 13, comprising an automotive body part.

15. An extruded shaped article comprising the polyamide matrix composition as defined by claim 1.

16. A polyamide matrix composition comprising:
    a continuous phase (1) of polyamide which comprises at least one novolak resin and electrically conductive fillers (B); and
    a dispersed phase (2) of a polymer (A) which is immiscible with the polyamide, in the continuous phase of polyamide (1), said disperse phase also comprising electrically conductive fillers (C), wherein the continuous phase (1) of polyamide comprises from 0.5% to 50% by weight of electrically conductive fillers (B), with respect to the total weight thereof.

17. A polyamide matrix composition comprising:
a continuous phase (1) of polyamide which comprises at least one novolak resin and electrically conductive fillers (B); and
a dispersed phase (2) of a polymer (A) which is immiscible with the polyamide, in the continuous phase of polyamide (1), said disperse phase also comprising electrically conductive fillers (C), wherein the continuous phase (2) of polymer (A) comprises from 0.5% to 50% by weight of electrically conductive fillers (C), with respect to the total weight of the dispersed phase (2) of polymer (A).

18. A molded shaped article comprising a polyamide matrix composition comprising:
a continuous phase (1) of polyamide which comprises at least one novolak resin and electrically conductive fillers (B); and
a dispersed phase (2) of a polymer (A) which is immiscible with the polyamide, in the continuous phase of polyamide (1), said disperse phase also comprising electrically conductive fillers (C), the molded shaped article having a coating electrostatically deposited thereon.

19. A molded shaped article comprising a polyamide matrix composition comprising:
a continuous phase (1) of polyamide which comprises at least one novolak resin and electrically conductive fillers (B); and
a dispersed phase (2) of a polymer (A) which is immiscible with the polyamide, in the continuous phase of polyamide (1), said disperse phase also comprising electrically conductive fillers (C), the molded shaped article having a paint coating electrostatically deposited thereon.

* * * * *